United States Patent
Watanabe et al.

(10) Patent No.: US 9,778,046 B2
(45) Date of Patent: Oct. 3, 2017

(54) VEHICLE TRAJECTORY CALCULATION METHOD

(71) Applicant: DENSO CORPORATION, Kariya, Aichi-pref. (JP)

(72) Inventors: Yuusuke Watanabe, Anjo (JP); Yuya Higuchi, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 69 days.

(21) Appl. No.: 14/768,093

(22) PCT Filed: Jan. 8, 2014

(86) PCT No.: PCT/JP2014/000031
§ 371 (c)(1),
(2) Date: Aug. 14, 2015

(87) PCT Pub. No.: WO2014/125754
PCT Pub. Date: Aug. 21, 2014

(65) Prior Publication Data
US 2016/0003629 A1 Jan. 7, 2016

(30) Foreign Application Priority Data

Feb. 18, 2013 (JP) .................................. 2013-029033

(51) Int. Cl.
*G01S 11/04* (2006.01)
*G01C 21/28* (2006.01)
(Continued)

(52) U.S. Cl.
CPC .............. *G01C 21/28* (2013.01); *G01S 19/45* (2013.01); *G01S 19/48* (2013.01); *G01S 19/49* (2013.01)

(58) Field of Classification Search
CPC . G01S 11/04; G01S 5/04; G01S 19/49; G01S 19/47; G01S 19/45; G01C 21/165; G01C 21/10; G01C 21/26; G01C 21/28
(Continued)

(56) References Cited

U.S. PATENT DOCUMENTS

2007/0213927 A1* 9/2007 Ishigami ................. G01C 21/26
701/417
2009/0063051 A1* 3/2009 Watanabe ............... G01C 21/26
701/472
(Continued)

FOREIGN PATENT DOCUMENTS

| JP | H07055480 A | 3/1995 |
| JP | 3013309 B1 | 2/2000 |

(Continued)

OTHER PUBLICATIONS

International Search Report and Written Opinion (in Japanese with English Translation) for PCT/JP2014/000031, mailed Apr. 22, 2014; ISA/JP.

*Primary Examiner* — Dalena Tran
(74) *Attorney, Agent, or Firm* — Harness, Dickey & Pierce, P.L.C.

(57) ABSTRACT

A vehicle trajectory calculation method is provided. In the vehicle trajectory calculation method, a travel trajectory of a vehicle in a travel route is calculated based on a GPS signal received at predetermined time intervals with a GPS receiver of the vehicle during traveling. When there is an unmeasurable section where the travel trajectory cannot be normally calculated based on the GPS signal, the travel trajectory in the unmeasurable section is calculating by performing an interpolation based on the calculated travel trajectories in sections anterior to and posterior to the unmeasurable section.

10 Claims, 6 Drawing Sheets

(51) Int. Cl.
*G01S 19/45* (2010.01)
*G01S 19/48* (2010.01)
*G01S 19/49* (2010.01)

(58) Field of Classification Search
USPC ........ 701/472, 32.3, 400, 469, 501, 507, 93,
701/517; 342/357.23, 357.25
See application file for complete search history.

(56) References Cited

U.S. PATENT DOCUMENTS

| | | | |
|---|---|---|---|
| 2010/0039318 A1* | 2/2010 | Kmiecik | G01C 21/165 |
| | | | 342/357.59 |
| 2011/0144905 A1 | 6/2011 | Tahara | |
| 2011/0235686 A1* | 9/2011 | Kojima | G01S 19/426 |
| | | | 375/141 |

FOREIGN PATENT DOCUMENTS

| | | | |
|---|---|---|---|
| JP | 2004251822 A | 9/2004 | |
| JP | 2005077114 A | 3/2005 | |
| JP | 2005316818 A | 11/2005 | |
| JP | 2006125906 A | 5/2006 | |
| JP | 2007155493 A | 6/2007 | |
| JP | 2008232630 A | 10/2008 | |
| JP | 2010276527 A | 12/2010 | |
| JP | 2011198281 A | 10/2011 | |
| JP | 2012093319 A | 5/2012 | |
| JP | 2012133023 A | 7/2012 | |
| WO | WO-2009157076 A1 | 12/2009 | |

\* cited by examiner

VEHICLE TRAJECTORY CALCULATION METHOD

CROSS-REFERENCE TO RELATED APPLICATIONS

This application is a U.S. National Phase Application under 35 U.S.C. 371 of International Application No. PCT/JP2014/000031 filed on Jan. 8, 2014 and published in Japanese as WO 2014/125754 A1 on Aug. 21, 2014. This application is based on and claims the benefit of priority from Japanese patent application No. 2013-029033 filed on Feb. 18, 2013. The entire disclosures of all of the above applications are incorporated herein by reference.

TECHNICAL FIELD

The present disclosure relates to a vehicle trajectory calculation method.

BACKGROUND ART

Some systems use a GPS signal received with a GPS receiver to calculate a trajectory of vehicle traveling on a road. However, the accuracy in position calculated based on the GPS signal largely varies depending on states of radio waves from GPS satellites. In particular, when a vehicle passes through a poor radio wave reception place or the vehicle is in a radio shielded state or the like, the GPS signals based positioning cannot be performed and the position cannot be calculated.

PRIOR ART LITERATURE

Patent Literature

PTL 1: JP 2004-251822A

SUMMARY OF INVENTION

The present disclosure is made in consideration of the foregoing and has an object to provide a vehicle trajectory calculation method that can calculate a travel trajectory based on vehicle travel information acquired via traveling of a vehicle even when a GPS signal cannot be normally received.

A vehicle trajectory calculation method according to an example of the present disclosure comprises calculating a travel trajectory of a vehicle in a travel route based on a GPS signal received at predetermined time intervals with a GPS receiver of the vehicle during traveling. The vehicle trajectory calculation method further comprises: when there is an unmeasurable section defined as a section where the travel trajectory cannot be normally calculated based on the GPS signal, calculating the travel trajectory in the unmeasurable section by performing an interpolation based on the travel trajectories in sections anterior to and posterior to the unmeasurable section.

According to the vehicle trajectory calculation method, the travel trajectory of the vehicle traveling in the travel route is calculated based on the GPS signal received with the GPS receiver of the vehicle. In some cases, for some reasons associated with a GPS signal reception state, the travel trajectory cannot be normally calculated and this provides the unmeasurable section. The travel trajectory of the vehicle in the unmeasurable section can be approximately obtained by performing the interpolation based on the travel trajectory calculated for the sections anterior to and posterior to the unmeasurable section.

BRIEF DESCRIPTION OF DRAWINGS

The above and other objects, features and advantages of the present disclosure will become more apparent from the below detailed description made with reference to the accompanying drawings. In the drawings.

DESCRIPTION OF EMBODIMENTS

An embodiment of the present disclosure will be described with reference to FIG. 1 to FIG. 6. The present embodiment is directed to detecting a vehicle trajectory by performing a calculation process based on vehicle travel information detected at a time of traveling of the vehicle. The acquisition of the vehicle travel information and the calculation process will be described below.

Figure 2:
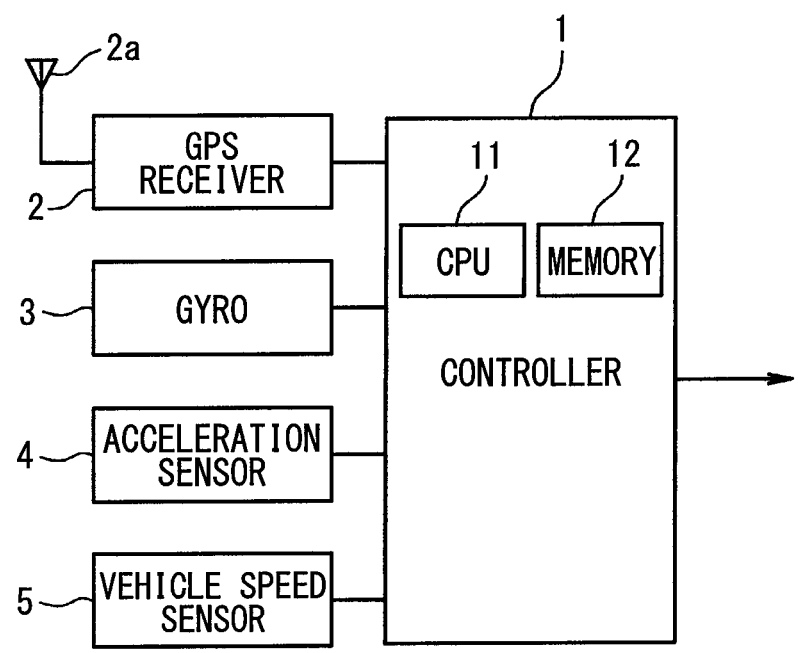
FIG. 2 is a diagram illustrating a configuration for acquiring vehicle information indicating a vehicle state during traveling.
Figure 3:
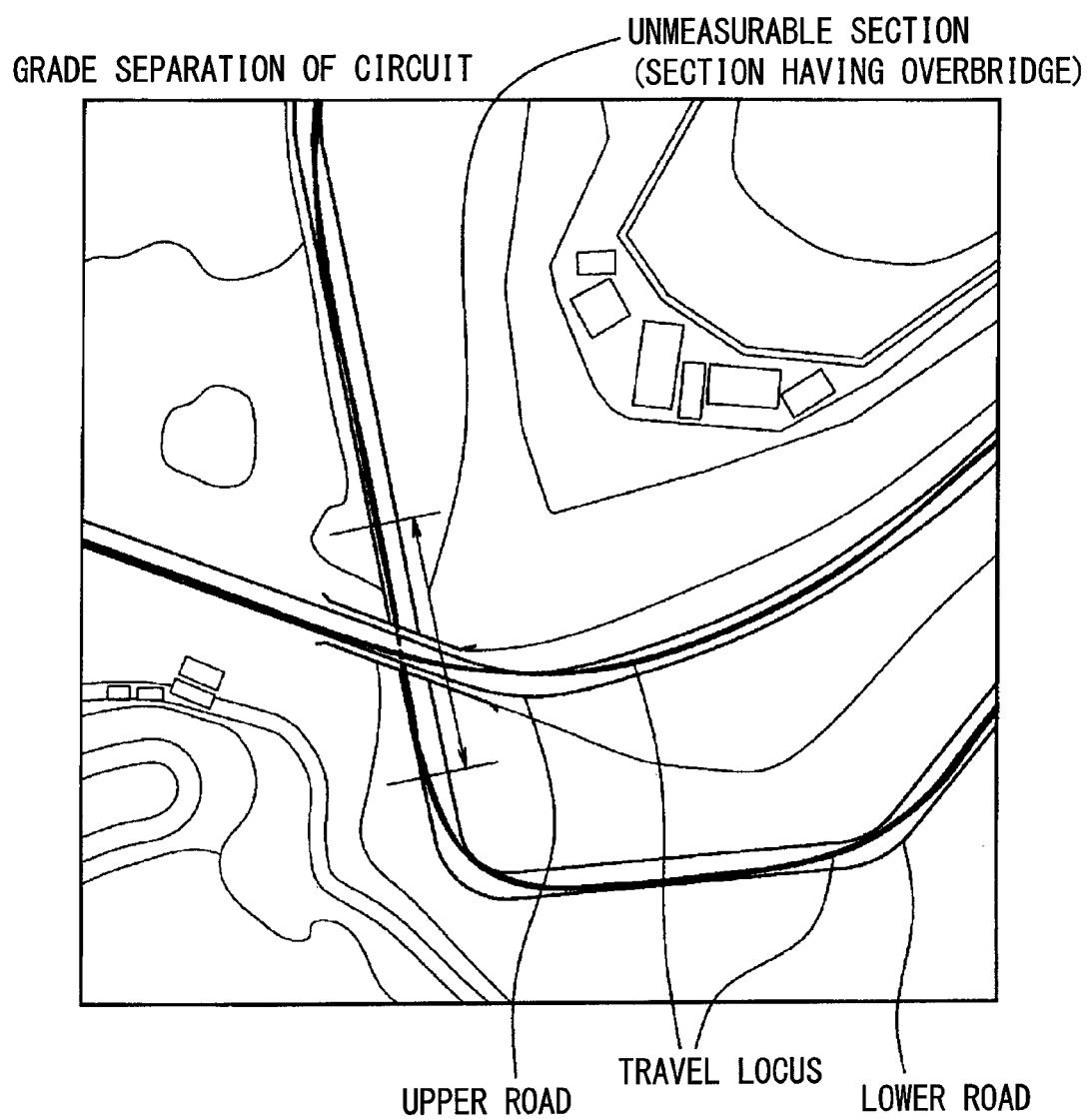
FIG. 3 is an explanatory diagram illustrating geographical features of an unmeasurable section and a trajectory of a vehicle.

FIG. 2 illustrates a configuration for acquiring the vehicle travel information. The vehicle is equipped with a control device 1 for calculating a travel trajectory and a vehicle orientation by dead-reckoning navigation. The control device 1 includes a CPU 11 as its main component, and includes a memory 12 and an input/output interface. The CPU 11 of the control device 1 can perform various processes based on programs stored in the memory 12 (storage medium). The control device 1 is connected with a GPS receiver 2, a gyroscope 3, an acceleration sensor 4, a vehicle speed sensor 5 and the like and receives various data.

The GPS receiver 2 receives radio waves from multiple GPS satellites via a GPS antenna 2a and acquires a GPS signal for detecting position information and velocity information. The gyroscope 3 (can function as a yaw rate sensor) acquires information on rotation about a vertical direction of the vehicle as a yaw rate value yr_gy of an angular velocity. The acceleration sensor 4 (can function as a lateral acceleration sensor) detects a vehicle lateral direction acceleration gy. The vehicle speed sensor 5 acquires data of travel speed v of the vehicle.

The above-mentioned various data are sampled at, for example, intervals of 100 ms (milliseconds) and stored as a data log of vehicle travel information in a non-volatile memory. The data sampling time interval is not limited to 100 ms and may be longer or shorter than it. The shorter the time interval, the higher the accuracy in vehicle orientation detection. The longer the time interval, the shorter the time taken to perform the calculation process.

Based on the vehicle travel information acquired in the above way, the control device 1 calculates the trajectory of the vehicle. In the configuration of FIG. 2, the trajectory of the vehicle is calculated by the control device 1. In the present embodiment, after the vehicle travel information is acquired, the trajectory of the vehicle is calculated based on the vehicle travel information. The trajectory of the vehicle is not calculated at each time the vehicle travel information is detected. Therefore, not only the control device 1 but also other computers such a microcomputer and a personal computer may be used to perform the calculation process based on the vehicle travel information stored in the non-volatile memory.

Next, explanation will be given on a process of calculating the vehicle trajectory based on the vehicle travel information acquired in the above configuration. A typical navigation device calculates the trajectory of the vehicle using dead-reckoning navigation based on a yaw rate value detected with the gyroscope 3 and vehicle speed information detected with the vehicle speed sensor 5 and performs map matching.

However, when an extreme maneuver in a circuit or the like is assumed for instance, the trajectory acquired from the dead-reckoning navigation may differ from an actual behavior in the case of drift driving etc. Thus, in order to eliminate this error, the present basically calculates the vehicle trajectory with the control device 1 based on the GPS signal acquired from the GPS receiver 2.

According to this basic assumption, there may generate an unmeasurable section, which is a section where the GPS signal based calculation of the trajectory cannot work well. For example, a building or the like affects a radio wave state and the accuracy may greatly deteriorate. In terms of absolute position, the radio wave is reflected by a building or the like depending on travel route environments, and accordingly, a multi-path effect may cause the deterioration in a section of approximately 100 m.

In a typical circuit racing, a building or the like is rarely present around a road and a reception environment is generally good. Suppose that a circuit has a multi-level crossing. In this case, when a vehicle travels a lower road of the multi-level crossing, the radio wave environment deteriorates for a short time. In sections anterior to and posterior to it, the travel trajectory of the vehicle can be calculated. Thus, the travel trajectory in the section having the radio wave deterioration is calculated by performing interpolating based on the information of the travel trajectories anterior to and posterior to it. After the traveling, the travel trajectory calculation including the interpolation can be performed based on the vehicle travel information acquired during the traveling.

The interpolation makes it possible to calculate data for the unmeasurable section by n-th order approximation, based on detected data of vehicle positions in sections anterior to and posterior to the unmeasurable section. By the n-th order approximation, the data obtained from the GPS signal may be broken down into its components, the angular velocity and the velocity, which are converted into corrected positions. A method of this calculation will be described later.

When a vehicle exhibits a maneuver unpredictable from the data of the previous and next sections, the reproduction of the trajectory by the above interpolation may be difficult. Thus, for such unmeasurable sections, the trajectory is calculated by using the interpolation in combination with the dead reckoning navigation in order to improve the accuracy. Because the above-described vehicle travel information is acquirable even when the GPS signal is not receivable, this information on the traveling in the unmeasurable section is usable.

At the same time, some traveling states are unsuitable for the dead reckoning navigation. In these cases, the interpolation is performed based o calculation results of the trajectories in sections anterior to and posterior to the unmeasurable section. For example, when the vehicle is in drift driving, the dead reckoning navigation based calculation of the trajectory produces an error. Thus, a condition for applying the dead reckoning navigation based calculation to the unmeasurable section is the absence of drift driving.

Figure 1:
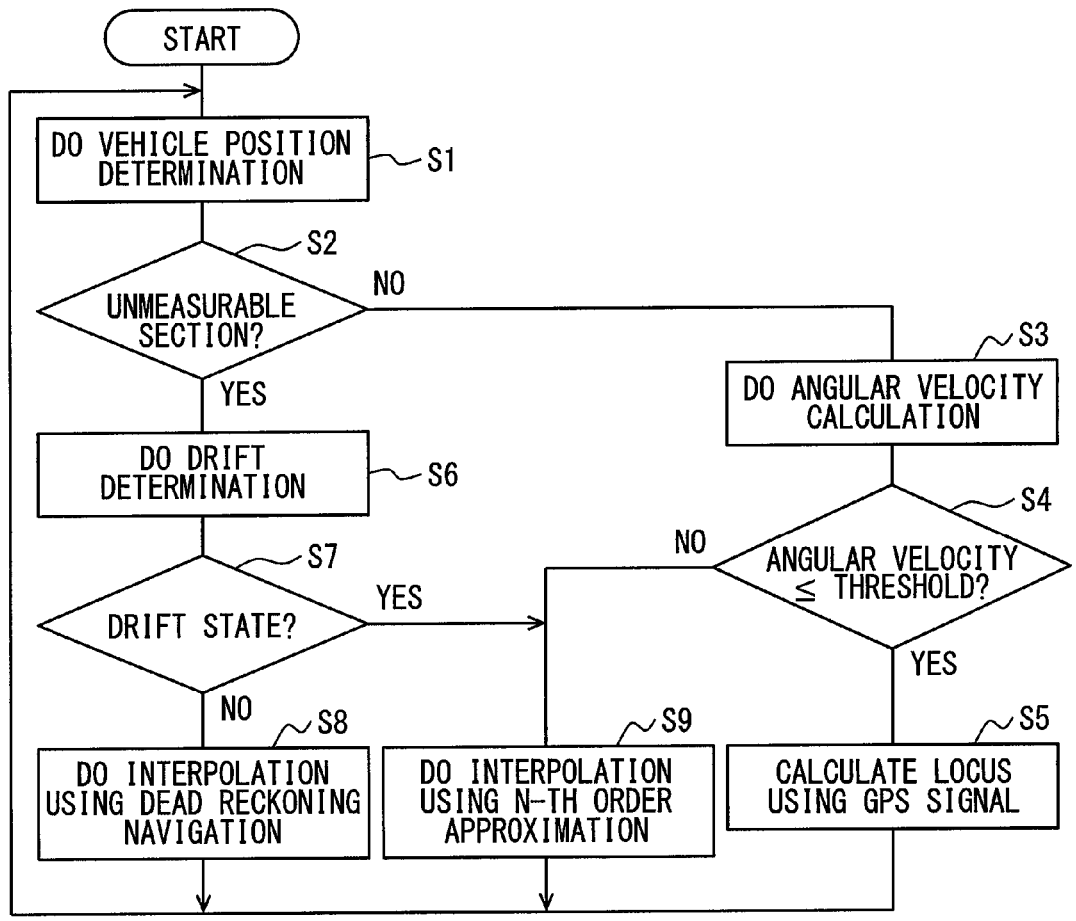
FIG. 1 is a diagram illustrating a flow of processes to calculate a vehicle trajectory based on vehicle data in accordance with an embodiment.

Next, the vehicle trajectory calculation process of the present embodiment will be described with reference to FIG. 1. It is assumed that the travel route of the vehicle includes a multi-level crossing of a circuit illustrated in FIG. 3. When the vehicle travels a lower road of the multilevel crossing, the GPS signal is shielded by an upper road and the GPS signal deteriorates. Thus, a section that has the multilevel crossing and extends fixed distances anterior and posterior to the multilevel crossing is set as the unmeasurable section. The fixed anterior and posterior distances for setting the unmeasurable section may be set in consideration of a reception level of the GPS signal received there.

The above-describe section having the lower road of the multilevel crossing is one unmeasurable section. Another unmeasurable section may be an environmental factor section, which is a section having an environmental factor associated with a road environment. The environmental factor may correspond to various places such as an inside of a tunnel, a place under a gate, a place under a bridge, a high-rise building street, a road in a yard, and a road with a road side wall. When this kind of environmental factors is present, a section extending fixed ranges posterior and posterior to this place are set as the unmeasurable section.

The control device 1 calculates the trajectory of the vehicle, based on the information acquired and recorded during the traveling of the vehicle. In this case, the control device 1 determines whether or not the position of the vehicle is in the unmeasurable section (S1) at each instant of time. The control device 1 can calculate the trajectory by acquiring the GPS signal in a majority of the travel route. However, the measurable section may require the below-described interpolation.

When the vehicle is not in the unmeasurable section (determined as No at S2), the angular velocity at that time is calculated (S3). Here, the angular velocity during the traveling is calculated by the control device 1. When this angular velocity is greater than or equal to a threshold representing an abnormal level, the control device determines that the GPS signal is disturbed and that this section is deemed the unmeasurable section. When the angular velocity is less than or equal to the threshold (determined as YES at S4), the control device 1 performs the trajectory calculation (S5) based on the GPS signal on assumption of no deterioration of the GPS signal.

For a vehicle position at a next instant of time, the control device 1 performs the calculation process in the same manners as described. When the vehicle position is in the measurable section, the control device 1 determines YES at S2 and performs a drift determination (S6).

The calculation of the vehicle trajectory in the unmeasurable section may have low accuracy when the GPS signal is unstable, e.g., when the GPS signal level is low. Thus, for such an unmeasurable section, the control device 1 performs the interpolation based on the trajectories anterior and posterior to the unmeasurable section depending on circumstances. In this relation, when the traveling state of the vehicle in the unmeasurable section is the absence of the drift state, the application of the dead-reckoning navigation using the yaw rate value of the gyroscope 3 or the like to the calculation of the trajectory can result in higher accuracy than the application of the interpolation. Thus, the below drift determination is made to determine whether or not the dead-reckoning navigation is applicable.

When the drift state is absent (determined as NO at S7) according to the drift determination (S6), the control device 1 performs the interpolation (S8) based on the dead-reckoning navigation. The control device 1 calculates the trajectory corresponding to respective measurement points in the unmeasurable section based on the data of the trajectories posterior and posterior to the unmeasurable section and the yaw rate value detected in the unmeasurable section with the gyroscope 3 and the like.

When it is determined that the drift state is present in the unmeasurable section (determined as YES at S7), the use of the dead-reckoning navigation may produces an error due to the drift of the vehicle. Accordingly, the control device 1 performs the interpolation (S9) based on the data of the trajectories posterior and posterior to the unmeasurable section, where the trajectories are calculated from the GPS signal. In this case, it may be effective to use curve approximation based on the data of the trajectories in predetermined ranges posterior and posterior to the unmeasurable section. For example, an N-th order approximation (third-order or higher) may be applied to calculate an interpolation data for smoothly connection through the unmeasurable section.

The control device 1 repeatedly performs the above processes, thereby calculating the trajectory in the travel route so that the calculated trajectory is close to the actual travel trajectory. In particular, in the unmeasurable section where the GPS signal may be disturbed and accordingly the travel trajectory cannot be calculated correctly, the dead-reckoning navigation is used to correctly calculate the travel trajectory.

The control device 1 does not sequentially perform the trajectory calculation at respective measurement points. Rather, for the trajectory in the measurement section or the trajectory in the case where the angular velocity is the threshold or less, the calculation based on the GPS signal (S5) may be performed first. For a part of the route where the trajectory was not calculated, a trajectory calculation process is performed separately, so that the trajectory is calculated for the unmeasurable section and the section that is set when the angular velocity exceeds the threshold.

Now, the drift determination at S6 of FIG. 1 will be described. Here, when an extreme maneuver such as drift driving is made, the vehicle trajectory may be calculated based on the signal of the yaw rate value outputted from the gyroscope 3.

The drift determination uses a mathematical expression representing a relation among the lateral direction acceleration gy [m/s$^2$], the yaw rate value yr_gy [°/s] of the gyroscope 3 and the vehicle speed v [m/s]. The data at each instance of time is substituted into the mathematical expression. When its relational expression is not satisfied, the drift state is determined.

A drift determination expression is based on relations written as the following expressions. Specifically, because the yaw rate value yr_gy detected with the gyroscope 3 is equal to the lateral direction acceleration gy divided by the vehicle speed v in the non-drifting grip state, the following expression (1) is satisfied.

$$yr\_gy = gy/v \qquad (1)$$

where yr_gy is the yaw rate value ([°/s], [dps]),
v is the vehicle speed [m/s], and
gy is the lateral direction acceleration [m/s$^2$].

Because the expression (1) is destroyed in the drift state, a difference between both sides is calculated. When the difference is greater than or equal to a threshold, it can be determined that the vehicle is in the drift state. In the above, the yaw rate value yr_gy is converted into one in radians yr and the expression is used to obtain the difference ω using the expression (2). The acceleration difference ω is converted into the value ω_gy that is based on the acceleration of gravity G (=9.8 [m/s$^2$]) as described in the expression (3).

$$yr = (yr\_gy) \times 2\pi/360 \, [rad/s]$$

$$\omega = gy - (yr \times v) \qquad (2)$$

$$\omega\_gy = \omega/9.8 \qquad (3)$$

The calculated ω_gy may vary widely because it is not directly converted from the detection output. Thus, the value ω_gy is converted into a value T (expression (4)) so that high frequency components are cut via a low pass filter such as Butterworth filter.

$$T = (b_0 + b_1 z^{-1} + b_2 z^{-2} + b_3 z^{-3} + b_4 z^{-4})/(1 + a_1 z^{-1} + a_2 z^{-2} + a_3 z^{-3} + a_4 z^{-4}) \qquad (4)$$

Figure 4:
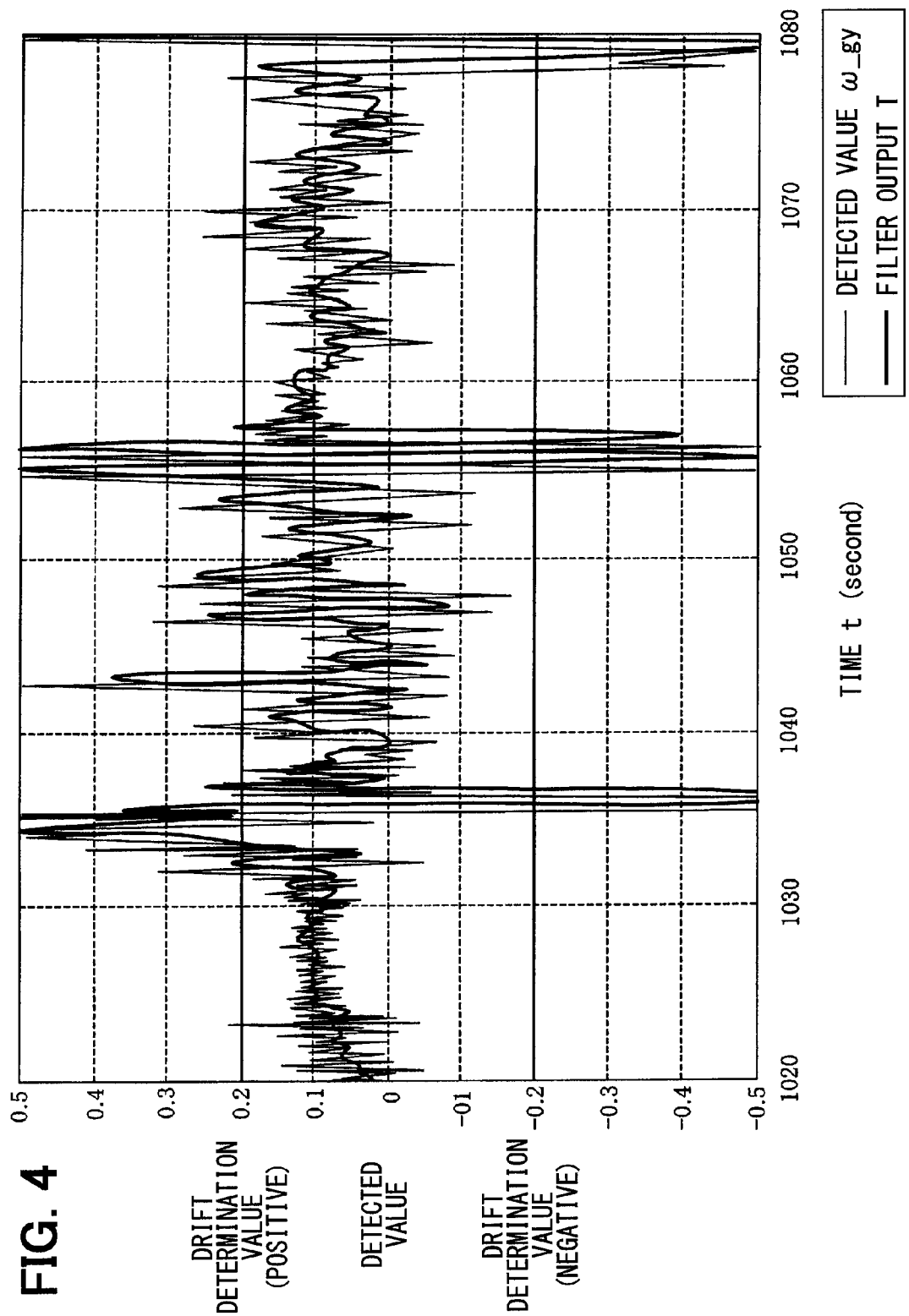
FIG. 4 is a diagram illustrating a signal output when a drift determination is made.

The value T obtained in the above is compared with a drift threshold (e.g., 0.2). When this difference exceeds it, it is determined that the vehicle is in the drift state. FIG. 4 illustrates a change in the detection value ω_gy and the filter output T with time. The detection value ω_gy fractionally changes with time, while the filter output T has a small change because of removal of its high frequency components. It is determined whether this filter output goes beyond positive and negative drift thresholds When the above drift state determination is made, the vehicle trajectory calculation process for the unmeasurable section may switch into the process (S8) in which the yaw rate value yr_gy of the gyroscope 3 is used. In order to prevent the unstable switching around the drift threshold in the above drift determination, what is called a hysteresis is set by posing different determination condition at a start time of drift state detection and an end time of drift state detection.

Moreover, in actual vehicle maneuvers, an error of 10 [°/s] or less may be produced at a stage before the drift determination is made using the relational expression among the yaw rate value yr_gy, the lateral direction acceleration gy and the vehicle speed v. Thus, when the yaw rate value yr_gy itself reaches a certain threshold, the drift determination is made to reduce the error.

Specifically, the following determination is made. In this example, in order that the drift determination do not become unstable near the drift threshold, different determination conditions are used at a start time of drift state detection and an end time of drift state detection. Additionally, in order to determine whether the drift state is ended, it is determined whether a time period satisfying the determination condition reaches a predetermined time (e.g., 1 second).

The determination condition at the start time of drift state detection includes a first condition and a second condition. As shown in the expression (5), the first condition is associated with a time point when the value T, which is the converted value and from which the high frequency components are removed via Butterworth filter as shown in the expression (4), has the absolute value of 0.2 or more. As shown in the expression (6), the second condition defines whether or not an angle between a relative vehicle orientation $DR_{rel}D(t)$ detected with the gyroscope 3 at a time t and a relative vehicle orientation $DR_{rel}D(t-1)$ at a time t−1 is greater than or equal 10 degrees. At a time of satisfaction of the first condition or the second condition, the drift state is determined.

$$|T(n)| \geq 0.2 \quad (5)$$

$$|DR_{rel}D(t)-DR_{rel}D(t-1)| \geq 10[dps] \quad (6)$$

Likewise, the determination condition at the end time of drift state detection includes a first condition and a second condition. As shown in the expression (7), the first condition is associated with a time point when the value T, which is the converted value and from which the high frequency components are removed via Butterworth filter as shown in the expression (4), has the absolute value of 0.1 or less. As shown in the expression (8), the second condition defines whether or not an angle between a relative vehicle orientation $DR_{rel}D(t)$ detected at a time t and a relative vehicle orientation $DR_{rel}D(t-1)$ at a time t−1 is less than or equal 10 degrees. The condition for ending the drift state is satisfaction of both the first condition and the second condition.

$$|T(n)| \leq 0.1 \quad (7)$$

$$|DR_{rel}D(t)-DR_{rel}D(t-1)| \leq 10[dps] \quad (8)$$

The above expressions (5) and (7) have the different drift thresholds, so that a range shown in the expression (9) gives a hysteresis region for preventing determinations result from being unstable.

$$0.1 < |T(n)| < 0.2 \quad (9)$$

Because the drift determination is made in the above way using the expressions (5) to (9) and the first and second conditions, it is possible to reliably determine when the vehicle starts drifting and ends drifting and it is possible to accurately detect the vehicle trajectory.

Now, explanation will be given on a calculation method of the vehicle trajectory in the unmeasurable section by performing the n-th order approximation based interpolation using the trajectories in the sections anterior and posterior to the unmeasurable section. In the above, the trajectories in the sections posterior and posterior to the unmeasurable section are calculated based on the GPS signal. The sections subject to the interpolation include the unmeasurable section and the section in which the angular velocity is greater than or equal to the threshold.

When the unmeasurable section is pre-designated, this unmeasurable section may be set to an interpolation section. When the angular velocity is greater than or equal to the threshold, the unmeasurable section may be set. In this case, the interpolation section is calculated first, and thereafter, the interpolation is performed.

When the interpolation section is calculated, an approximate calculation is performed using the data of trajectories in predetermined time spans posterior and posterior to the interpolation section. For example, the data of trajectories in the time spans of 1.5 seconds posterior and posterior to it may be used to calculate an n-th order approximated line for the interpolation.

Specifically, a third-order approximation correction to a data of a correction section in terms of the speed V and the orientation θ is made based on 1.5 seconds time period data posterior and posterior to the correction section; thereby, the corrected speed Vc and the corrected orientation θc are calculated. In this case, because the vehicle trajectory becomes similar to a circular motion, it can be broken down into an angular velocity and a velocity and approximation of each of these improves accuracy.

$$\text{Velocity } V=[(V_N)^2+(V_E)^2]^{1/2} \quad (10)$$

$$\text{Orientation } \theta = \arctan(V_N/V_E) \quad (11)$$

The resultant corrected velocity V and orientation θ are reconverted into velocity components VNc and VEc.

$$V_Nc = Vc \times \sin \theta c \quad (12)$$

$$V_Ec = Vc \times \cos \theta c \quad (13)$$

Figure 5:
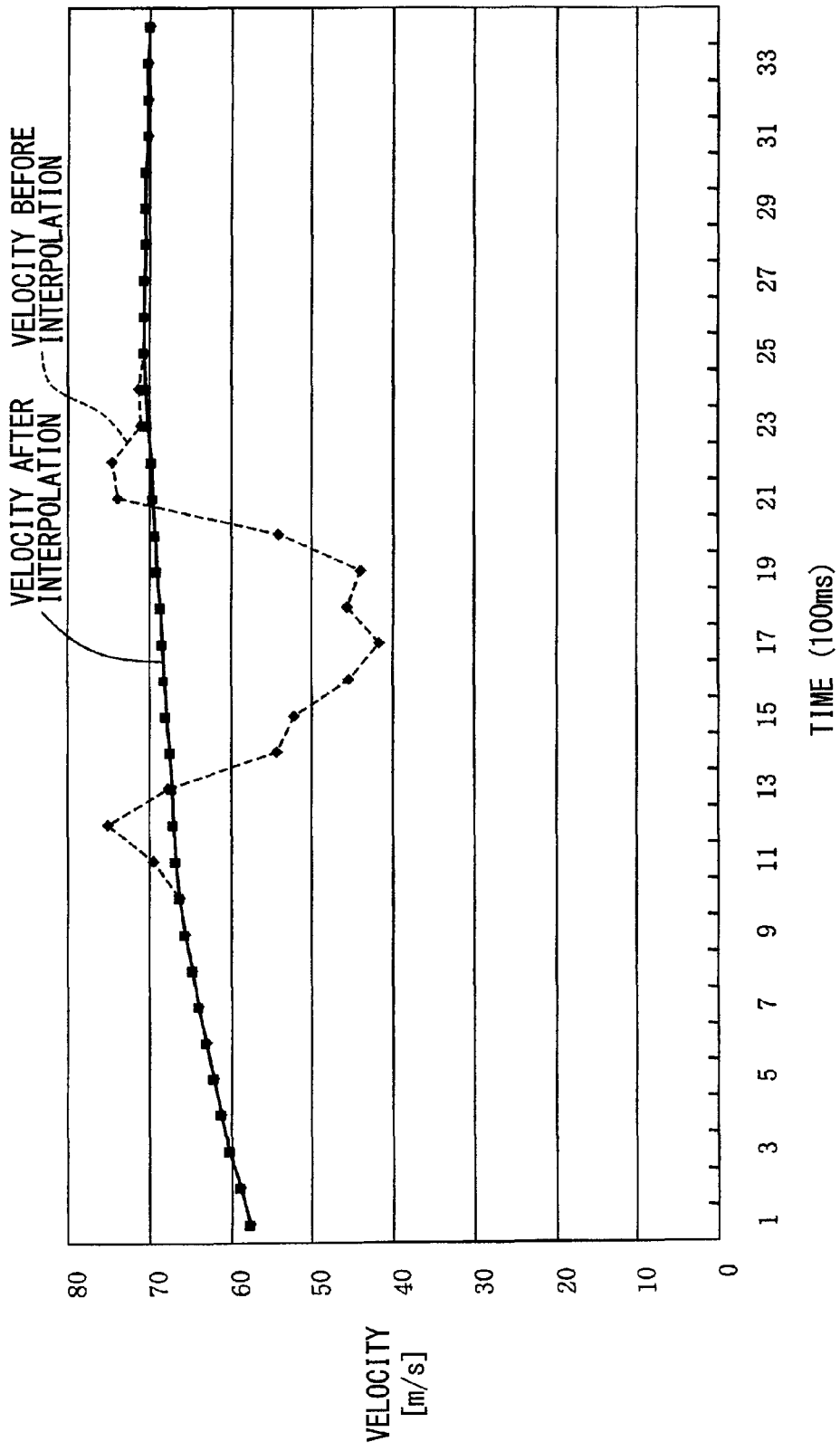
FIG. 5 is a diagram illustrating a trajectory orientation data of a vehicle traveling in an unmeasurable section and an interpolation data calculated with a GPS signal.

FIG. 5 illustrates experimental results when the approximation and interpolation are performed with these components (angular velocity). In FIG. 5, as the time passes, the velocity V changes into a large value once and then greatly decreases and increases again. The unmeasurable section is set to include a section having this extraordinary angular velocity change. The trajectory in the unmeasurable section is calculated by the approximate calculation based on data of trajectories in sections anterior to and posterior to the unmeasurable section. Calculation results are shown in FIG. 5 in which the data in the interpolation section is estimated as the approximated curve, which is smooth to the velocities anterior to and posterior to the unmeasurable section.

Next, explanation will be given on the unmeasurable section (S3, S4) for the trajectory calculation process other than the pre-designated unmeasurable sections. This is because the interpolation only for the pre-designated unmeasurable section cannot cope with the following situation. Specifically, a structure such as a building and a side wall is identifiable in advance to designate a section where the reception level of the GPS signal is reduced. Trees or unexpected objects may produce a section where the radio wave is disturbed. Because the growth of trees or the like increases the possibility of radio wave blocking, it may produce situations to be addressed according to seasons. This should be the unmeasurable section in some cases.

In general, the orientation of the vehicle does not abruptly change during the traveling unless a sudden change such drifting and collision is absent. That is, the vehicle trajectory is supposed not to change suddenly. From this viewpoint, the angular velocity is calculated from the velocity vector of the GPS signal. When this angular velocity exceeds a given value, this state is considered as an extraordinary state and this place is considered as being in a section where the GPS signal cannot be received. This section is set as the unmeasurable section.

Figure 6:
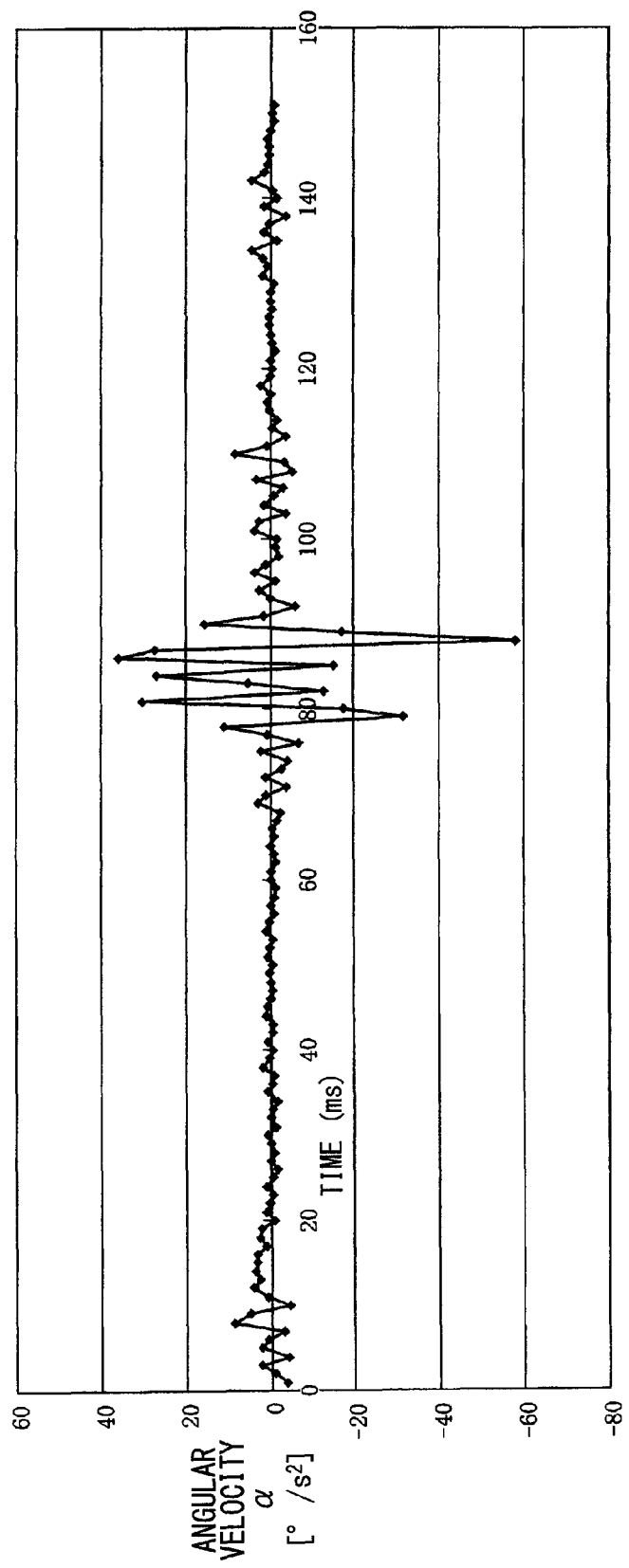
FIG. 6 is a diagram illustrating a situation where angular velocity value exhibits an extraordinary value.

For example, as shown in FIG. 6, the angular velocity may greatly vary with time. It can be estimated that the variation in this section results from an unstable reception level of the GPS signal rather than a sudden trajectory change. Thus, this kind of situations is calculated and the unmeasurable section is set.

An extraordinary place detection method and a correction section calculation method will be described below.

An n-th velocity vector V(n) has a component $V_N(n)$ (south-to-north direction component) and a component $V_E(n)$ (west-to-east direction component). From these components, the orientation θ(n) of the velocity vector V(n) can be obtained from the expression (14).

$$\text{Orientation } \theta(n) = \arctan(V_N(n)/V_E(n)) \times 180/\pi[°] \quad (14)$$

$$\text{Angular velocity } \omega(n) = [\theta(n)-\theta(n-1)] \times 10[°/s] \quad (15)$$

Angular acceleration $\alpha(n)=\omega(n)-\omega(n-1)[°/s^2]$ (16)

Judging formula $|\alpha(n)|\geq 20[°/s^2]$ (17)

Specifically, the angular acceleration α having the absolute value of 20 [°/s²] or more is subject for an extraordinary section and the unmeasurable section is set as follows.

The section including a first section and second sections anterior to and posterior to the first second section is set as the unmeasurable section. The first section is the section detected in the expression (17). Each second section is a section where the data does not satisfies the expression (18) for a time period of 1 second.

$\alpha(n)\geq 10[°/s^2]$ (18)

A series of acquired data is assumed as follows.
$\alpha(p-10), \ldots, \alpha(p), \ldots, \alpha(-1), \alpha(0), \alpha(1), \ldots, \alpha(q), \ldots, \alpha(q+10)$
$\alpha(0)\geq 20[°/s^2]$
$\alpha(p-10), \ldots, \alpha(p), \alpha(q), \ldots, \alpha(q+10)<10[°/s^2]$ Now, α(0) is assumed to meet the expression (17). A first point within the section having α(0) is defined as the first of the points not satisfying the expression (18) within the section having α(0), A section containing the first point to the tenth-point (for 1 second) is set as the unmeasurable section. Thus, the unmeasurable section having the start point (p−10) and the end point α(q+10) is obtained. The control device 1 detects and sets this kind of unmeasurable section and performs the above-mentioned interpolation for the unmeasurable section.

The above embodiments can provide the following technical effects.

A first technical effect is as follows. There may be an unmeasurable section where the travel trajectory cannot be calculated normally for some reasons which may be associated with the reception state of the GPS signal received with the GPS receiver 2. Even when there is the unmeasurable section, the control device 1 can approximately obtain the travel trajectory in the unmeasurable section by performing the interpolation based on the GPS signal based calculated travel trajectories in sections anterior to and posterior to the unmeasurable section.

A second technical effect is as follows. In the interpolation, the data of calculated travel trajectories in the fixed sections anterior to and posterior to the unmeasurable section is used to calculate the travel trajectory in the unmeasurable section through an n-th order (third order or higher approximated line, i.e., curve approximation. In this case, in light of a vehicle motion close to a circular motion, the third order approximation can calculate a relatively accurate trajectory without employing a fourth-order or higher-order approximated line.

A third technical effect is as follows. The drift state in the unmeasurable section is checked with the configuration including the gyroscope 3, the lateral acceleration sensor 4, and the vehicle speed sensor 5 in addition to the GPS receiver 2. When the drift state is present, the interpolation is performed. When the drift state is absent, the trajectory in the unmeasurable section is calculated based on the dead-reckoning navigation. This combined use of the dead-reckoning navigation performs the accurate trajectory calculation.

A fourth technical effect is as follows. An environmental factor section, which has a place where a geometric condition of the travel route decreases or disturbs a reception level of the GPS signal, is pre-designated as the unmeasurable section. Therefore, even if the vehicle travel information during the traveling in the unmeasurable section is acquired, the control device 1 can calculate the trajectory in the unmeasurable section by the interpolation so as to smoothly connect trajectories.

A fifth technical effect is as follows. The environmental factor section designated as the unmeasurable section is a section where a structure shielding or disturbing the radio wave from a GPS satellite is located above or on a side of the travel route. Therefore, even if the unmeasurable section is a lower part of a multilevel crossing and has a lower GPS signal than other areas for instance, the control device 1 can calculate the trajectory in the unmeasurable section by the interpolation so as to smoothly connect trajectories.

A sixth technical effect is as follows. Before the travel trajectory is calculated, an unmeasurable section setting process is performed to set the unmeasurable section based on an angular velocity value calculated based on the GPS signal. Therefore, when the travel route has a place that is not pre-designated as the unmeasurable section and that is a poor radio wave environment due to the growth of trees for example, this place may be detected for setting the unmeasurable section and calculating the vehicle trajectory with higher accuracy.

A seventh technical effect is as follows. In the unmeasurable section setting process, the control device 1 detects an extraordinary section in which the angular velocity value calculated based on the GPS signal is greater than or equal to a first threshold (20°/s²), and sets the unmeasurable sections to a section that includes a predetermined time range (1 second) anterior to the extraordinary section and a predetermined time range e (1 second) posterior to the extraordinary section. Because of this, the unmeasurable section is set to include the extraordinary section, in which the GPS signal level is unstable, and sections in each which a boundary with the unmeasurable section is included. Therefore, the interpolation using trajectories anterior to and posterior to the unmeasurable section can be based on the reliably calculated trajectories. A high accuracy trajectory can be interpolated.

An eighth technical effect is as follows. In the interpolation, the control device 1 brakes down an angular velocity value in the unmeasurable section into an orientation and a velocity to perform approximation with an n-th order approximated line based on the travel trajectories in the fixed sections anterior to and posterior to the unmeasurable section, where n is an integer greater than or equal to 3. Therefore, the high accuracy trajectory calculation can be made so that the calculated trajectory is close to an actual vehicle trajectory.

(Other Embodiment)

Embodiments of the present disclosure are not limited to the above-illustrated embodiments and can cover various embodiments within spirit and scope of the present disclosure. For example, modifications and extensions can be made in the following ways.

In the trajectory calculation process, after the unmeasurable section determination (S2) is made, the drift determination (S6) or the angular velocity determination (S3) is made. However, an order of these determinations may be changed. An adoptable flow may determine processing based on whether a combination of the conditions is met.

The unmeasurable section can be set before the vehicle travels. Alternatively, after the vehicle travels and the vehicle travel information is acquired, the unmeasurable section may be set to perform the calculation process.

The drift determination may be optional. When the drift determination is not made, the interpolation using n-th order approximation may be performed. When the yaw rate value of the gyroscope 3, the lateral direction acceleration of the acceleration sensor 4 or the vehicle speed of the vehicle speed sensor 5 is acquirable in addition to the GPS signal, the drift determination may be made based on these kinds of information.

The approximation using a 3rd order approximated line is illustrated as the n-th order approximation in the interpolation for calculating the trajectory. The n-th order may be fourth order or higher.

In the processing of setting the unmeasurable section through calculating the angular velocity and comparing it with a threshold, the threshold may be set to a value that one thinks approximate. It may be approximate to set the threshold to levels in consideration of a relation between a detection signal and noise.

The data corresponding to 1.5 seconds is illustrated as the data of the trajectories anterior to and posterior to the unmeasurable section. Alternatively, a data corresponding other times or distances may be used in consideration of various conditions such as speeds and travel routes.

A level of the drift threshold for determining the drift state may be set according to various factors such as vehicle travel conditions, road conditions and detection signal states. Likewise, a level of the drift end threshold may be set appropriately. Adjustments may be made to improve determination accuracy of the drift date and to avoid erroneous determination according to noise level.

The high frequency components of the lateral direction acceleration difference signal $\omega\_gy$ are cut with Butterworth filter. Alternatively, any filters that can function as a low pass filter can be used instead of Butterworth filter.

Although embodiments and configurations of the present disclosure have been illustrated, embodiments and configurations are not limited to the respective embodiments and configurations illustrated above. A part of the above-illustrated embodiment falls within embodiments and configurations of the present disclosure. Embodiments and configurations obtained by appropriately combining technical elements disclosed in different embodiments and configurations also fall within embodiments and configurations of the present disclosure.

What is claimed is:

1. A vehicle trajectory calculation method comprising:
calculating, with a controller having a processor, a travel trajectory of a vehicle in a travel route based on a GPS signal received at predetermined time intervals with a GPS receiver of the vehicle during traveling, the vehicle trajectory calculation method further comprising:
when there is an unmeasurable section where the travel trajectory cannot be normally calculated based on the GPS signal, calculating, with the controller, the travel trajectory in the unmeasurable section by performing an interpolation based on the calculated travel trajectories in sections anterior to and posterior to the unmeasurable section,
wherein the traveling vehicle is equipped with a yaw rate sensor, a lateral direction acceleration sensor and a vehicle speed sensor,
the vehicle trajectory calculation method further comprising:
performing, with the controller, a drift determination in the measurable section when a yaw rate value, a lateral direction acceleration value and a vehicle speed value are acquired in addition to the GPS signal, wherein the drift determination in the unmeasurable section determines whether or not a traveling state of the vehicle is a drifting state; and
calculating, with the controller, the travel trajectory in the unmeasurable section based not on the interpolation but on the yaw rate value detected with the yaw rate sensor when the drift determination determines that the traveling state of the vehicle is not the drifting state.

2. The vehicle trajectory calculation method according to claim 1, further comprising:
wherein the interpolation to calculate the travel trajectory in the unmeasurable section includes curve approximation using the travel trajectories in fixed sections anterior to and posterior to the unmeasurable section.

3. The vehicle trajectory calculation method according to claim 2, wherein
in the interpolation, an angular velocity value in the unmeasurable section is broken down into an orientation and a velocity to perform approximation with an n-th order approximated line based on the travel trajectories in the fixed sections anterior to and posterior to the unmeasurable section, where n is an integer greater than or equal to 3.

4. The vehicle trajectory calculation method according to claim 1, further comprising
pre-designating, with the controller, an environmental factor section as the unmeasurable section, wherein the environmental factor section has a place where a geometric condition of the travel route decreases or disturbs a reception level of the GPS signal.

5. The vehicle trajectory calculation method according to claim 4, wherein
in the environmental factor section serving as the unmeasurable section, a structure shielding or disturbing the radio wave from a GPS satellite is located above or on a side of the travel route.

6. A non-transitory storage medium storing a program that causes the processor to execute the vehicle trajectory calculation method recited in claim 1.

7. A control apparatus comprising
a memory storing a program; and
the controller having the processor configured to, based on the program stored in the memory, execute the vehicle trajectory calculation method recited in claim 1.

8. A vehicle trajectory calculation method comprising:
calculating, with a controller having a processor, a travel trajectory of a vehicle in a travel route based on a GPS signal received at predetermined time intervals with a GPS receiver of the vehicle during traveling, the vehicle trajectory calculation method further comprising:
when there is an unmeasurable section where the travel trajectory cannot be normally calculated based on the GPS signal, calculating, with the controller, the travel trajectory in the unmeasurable section by performing an interpolation based on the calculated travel trajectories in sections anterior to and posterior to the unmeasurable section; and
before calculating the travel trajectory, performing, with the controller, an unmeasurable section setting process of setting the unmeasurable section based on an angular velocity value calculated based on the GPS signal.

9. The vehicle trajectory calculation method according to claim 8, wherein the traveling vehicle is equipped with a yaw rate sensor, a lateral direction acceleration sensor and a vehicle speed sensor, the vehicle trajectory calculation method further comprising:

performing, with the controller, a drift determination in the measurable section when a yaw rate value, a lateral direction acceleration value and a vehicle speed value are acquired in addition to the GPS signal, wherein the drift determination in the unmeasurable section determines whether or not a traveling state of the vehicle is a drifting state; and calculating, with the controller, the travel trajectory in the unmeasurable section based not on the interpolation but on the yaw rate value detected with the yaw rate sensor when the drift determination determines that the traveling state of the vehicle is not the drifting state.

10. The vehicle trajectory calculation method according to claim 8, wherein
the unmeasurable section setting process includes:
detecting, with the controller, an extraordinary section in which the angular velocity value calculated based on the GPS signal is greater than or equal to a first threshold; and
setting, with the controller, the unmeasurable sections to a section that includes a predetermined time range anterior to the extraordinary section and a predetermined time range posterior to the extraordinary section.

* * * * *